United States Patent [19]

Washisu

[11] Patent Number: 4,869,108

[45] Date of Patent: Sep. 26, 1989

[54] ACCELEROMETER SYSTEM

[75] Inventor: Koichi Washisu, Tokyo, Japan

[73] Assignee: Canon Kabushiki Kaisha, Tokyo, Japan

[21] Appl. No.: 313,323

[22] Filed: Feb. 21, 1989

Related U.S. Application Data

[63] Continuation of Ser. No. 130,177, Dec. 8, 1987, abandoned.

[30] Foreign Application Priority Data

Dec. 12, 1986 [JP]  Japan ................................ 61-296448

[51] Int. Cl.⁴ ............................................. G01P 15/13
[52] U.S. Cl. ................................................ 73/517 B
[58] Field of Search ......................... 73/517 R, 517 B

[56] References Cited

U.S. PATENT DOCUMENTS

| | | | |
|---|---|---|---|
| 4,315,433 | 2/1982 | Edelman et al. | 73/517 R |
| 4,512,193 | 4/1985 | Fukano | 73/517 B |
| 4,663,972 | 5/1987 | Gérard | 73/517 B |

Primary Examiner—Stewart J. Levy
Assistant Examiner—Robert P. Bell
Attorney, Agent, or Firm—Fitzpatrick, Cella, Harper & Scinto

[57] ABSTRACT

An accelerometer is provided with a pendulum having a coil, a support for the pendulum to swing in a magnetic field, and a control circuit electrically connected to the coil and responsive to detection of a swing motion of the pendulum for supplying a control current to the coil to suppress the swing motion, wherein the value of the control current is taken as information representing the acceleration acted on the pendulum, wherein the coil is formed by a printing technique on a sheet member which constitutes part of the pendulum.

4 Claims, 3 Drawing Sheets

ACCELEROMETER SYSTEM

This application is a continuation of application Ser. No. 130,177 filed Dec. 8, 1987, which is now abandoned.

BACKGROUND OF THE INVENTION

1. Field of the Invention

This invention relates to servo-accelerometers suited to be used as a high precision vibration detector for instruments subject to vibrations of relatively low frequency and, more particularly, to servo-accelerometers which, when used in cameras or like instruments, detect vibrations from, for example, hand shake to permit an optimum performance of the image blur preventing system thereof.

2. Description of the Related Art

As is well known, the frequencies of, for example, the normal jiggle of a camera are distributed in a low region of from 1 to 12 Hz. In order to make up an image blur preventing system which can militate against such delicate vibrations, a high precision acceleration sensor must be employed. Such an accelerometer is disclosed in U.S. Pat. No. 4,611,491.

A production view of one prior known servo-accelerometer is shown in FIG. 3, where a housing of the servo-accelerometer is comprised of a housing lid 105 and a housing bottom 101. The housing lid 105 is fixedly secured to the housing bottom 101. A leaf-shaped support spring 102 of small rigidity is supported at its ends by the housing lid 105 and the housing bottom 101, respectively. By means of the spring 102, a pendulum 104 on which a coil 103 is mounted is swingably suspended. To unify the pendulum 104 with the support spring 102, the pendulum 104 is provided with jaw members 104a and 104b for clamping the support spring 102. It should be noted that, to mount the support spring 102 in a fixedly secured relation to the housing, its upper end is sandwiched between abutments 101b and 105a of a housing side 101a and the housing lid 105 respectively, and its lower end between abutments 101c and 101d of the housing side 101a and the housing bottom 101 respectively.

Above and below the assembly of the coil 103 and the pendulum 104, there is a magnetic circuit plate in the form of the lid 105 and two pair of permanent magnet pieces 106a and 106b, and 106c and 106d, respectively, in spaced relation to the assembly. The upper magnetic circuit plate also serves as the housing lid 105 as has been described above. The permanent magnet pieces 106a and 106b are fixedly mounted on a magnetic circuit back plate 107 which is secured to the housing bottom 101.

At the central area of the pendulum 104 there is provided a slit 108 through the wall thereof. An infrared light-emitting diode or light projector 109 is arranged on the inner surface of the housing lid 105 in alignment with the slit 108. Beneath the slit 108 is arranged a position sensitive device (PSD), silicon photo-cell (SPC) or like photo-electric type displacement detector 110 on the inner surface of the magnetic circuit back plate 107. Stoppers 115 and 116 limit a range of swinging movement of the pendulum 104. By this pendular amplitude limit means or stoppers 115 and 116, a larger torsional force than necessary is prevented from acting on the support spring 102.

Now assuming that an acceleration "a" works on the housing in a direction indicated by the arrow in FIG. 3, then the pendulum 104 is related to swing in the opposite direction to the acceleration "a". This pendular angle can be detected by the displacement detector 110 on the basis of a position of a light beam emitted from the projector 109 through the slit 108 to the displacement detector 110.

Incidently, a magnetic flux from the permanent magnet piece 106a goes in the following direction: the permanent magnet piece 106a→coil 103→magnetic circuit plate (105)→coil 103→permanent magnet piece 106b. Another magnetic flux from the permanent magnet piece 106b has the following route: the permanent magnet piece 106b →magnetic circuit back plate 107→permanent magnet piece 106a. In all, a closed magnetic circuit is formed with the magnetic fluxes in perpendicular directions to the coil 103. By a control current flowing to the coil 103, according to Fleming's rule, the pendulum 104 can be moved to either side in the direction of displacement in which the acceleration "a" works.

FIG. 4 shows an example of the structure of the acceleration detecting circuit usable in the accelerometer of the character described above. This circuit comprises the above-described displacement detector 110, an amplifier 111 for amplifying an output of the detector 110, a compensation circuit 112 for stabilizing this feedback circuit, a transistor circuit 113 for further amplifying the output of the compensation circuit 112, and the coil 103 arranged in a common series connection. And, in this example, the direction of winding of the coil 103 and the orientation of the polarities of the permanent magnet pieces 106a and 106b are so determined that when the current flows to the coil 103, the direction of the exerted force is opposite to the pendular direction of the pendulum 104 by the external acceleration "a".

The operative principle of the servo-accelerometer of such construction is explained below. Now assuming that the accelerometer is given the acceleration "a" from the outside of its housing, then the pendulum 104 apparently swings by the inertial force in the opposite direction to that of the displacement of the housing. Therefore, the slit 108 of the pendulum 104 moves in a direction L in FIG. 4, causing a change of the position of incidence of the center of the light beam from the projector 109 to the displacement detector 110. Hence, the output of the displacement detector 110 is proportional to the displacement amount of the pendulum 104.

This output is then processed by the circuit of FIG. 4 in the manner described above. In more detail, it is amplified by the displacement detecting amplifier 111, and further current amplification is carried out by the transistor circuit 113 to energize the coil 103.

With this, the direction of current flow to the coil 103 is controlled in such a manner that a force of the opposite direction R to the direction L of displacement of the housing, or acceleration "a", is exerted on the pendulum 104. Thus, the point of incidence of the light beam on the displacement detector 110 tends to return to the initial position which it took when the acceleration "a" was not applied to the housing.

Further, the intensity of this control current flowing through the coil 103 is proportional to the magnitude of the force of returning the pendulum 104 to the original point, which in turn is proportional to the force applied to the pendulum 104, in other words, the magnitude of acceleration "a". Hence, by using a resistor 114 to read the current in the form of a voltage V, it is made possible to obtain the magnitude of acceleration "a" as information necessary to control the operation of the image blur preventing system in, for example, the camera.

As that the requirement for acceleration detection be performed with high accuracy, such a servo-accelerometer has been found to be sufficient. From the point of view of its constructional features, on the other hand, the requirement for the precision accuracy of assembly is very rigorous. Therefore, the above-described accelerometer has a problem that the efficiency of assembling operation is difficult to increase.

Taking an example of the fitting relationship of the coil 103 on the pendulum 104 as shown in FIG. 5, because the coil 103 is generally formed to a number of windings of an enameled wire, its size differs relatively largely from item to item. Therefore, the design size of that area 104c of the pendulum 104 on which the coil 103 is to be mounted (for example, the recessed portion or opening in which it is to be fitted) must be taken at so large a value as to enable mounting of the coils of the maximum possible size. For smaller coils, on the other hand, it becomes difficult to accurately regulate their attitude. Therefore, it will result that the coil 103 is mounted obliquely relative to the plane of the pendulum 104.

And, if such oblique mounting takes place, there will be a serious loss of the detection accuracy of the accelerometer.

Another requirement is that the lead wires to the coil 103 be provided on the pendulum 104 without preventing the movement of the pendulum 104. To fulfill this, it has been usual in the prior art that a pair of terminals are positioned near the support spring 102 to interconnect the coil 103 to the circuit of FIG. 4. The use of such means increases the difficulty of the assembling operation. Another problem is that as the size of the solder spot on the connection between either end of the coil 103 and the terminal increases, there is some possibility of interference with the permanent magnet piece 106a, 106b, or the lid 105 as the magnetic circuit plate.

Yet another problem arises from the necessity of giving a proper dynamic range for the pendulum 104 as is suggested by the use of the stoppers described above. If this pendular amplitude limit means is formed to such stoppers and positioned at such locations as indicated at 115 and 116 in FIG. 3, as was usual in the past, because the framework as the base of the stopper is too complicated in structure to be made up as a unit with the stoppers using a molding technique, that the amplitude limit means cannot be produced without involving a problem. As to the material of the stoppers, in order not to disturb the magnetic field, use of a non-magnetic material is preferred. In the framework, on the other hand, for the formation of the magnetic circuit, the use of magnetic material prevails. For these reasons, it is substantially difficult to form the stoppers as a unified part to the framework. In the prior art, therefore, an additional problem arose that the stoppers had, after all, to be prepared as the separate parts and later assembled with the framework, or such troublesome and time-consuming steps had to be introduced into the process of manufacture.

SUMMARY OF THE INVENTION

An object of the present invention is to provide an accelerometer of the type described which enables the assembling process which took a long time in the prior art to be shortened and is advantageous at realizing an improvement in the facility and speed of its manufacturability.

Another object is to provide an accelerometer of such a structure as to permit the attitude of the coil to the pendular motion to be controlled with a sufficiently high accuracy during its assembly.

Still another object is to simplify the structure of construction of the means for defining a dynamic range of the pendulum as far as possible and to provide an accelerometer which is amenable to techniques of reducing the number of parts and lowering the unit production cost, while still preserving high precision accuracy.

To achieve these objects, in application of the invention to the accelerometer of the type having a pendulum fixedly carrying a coil, means for supporting the pendulum in the magnetic field to permit pendular motion, and a control circuit electrically connected to the coil and responsive to detection of the pendular motion for controlling the current flowing to the coil to suppress the pendular motion, and in which the value of the control current is taken as information representing the degree of acceleration given to the housing of the accelerometer, a feature of the invention resides that the above-described coil is constructed in the form of a printed sheet which is later used to make up the pendulum.

In connection with this production technique, it should be noted that as the material of the substrate of the sheet use may be made of, for example, polyester or polyimide resin, provided that the rigidity of the substrate is strong enough to maintain the stability of the flatness of the sheet to the pendular motion. The pendulum with the coil fabricated thereon can be formed by the punching means or the like. Prior to the punching step, a large number of coils may be fabricated on a common substrate sheet by using any of the suitable printing methods known to those skilled in the art. For example, such methods include the photographically depicting the coil in the sheet, or the photoengraving method of applying the coil-shaped pattern on the substrate.

DETAILED DESCRIPTION OF THE PREFERRED EMBODIMENTS

The present invention is next described in connection with embodiments thereof by reference to the drawings. These embodiments have their characteristic feature only in the structure of construction of the pendulum, the other parts being similar in construction and arrangement to those of the prior known accelerometer described in connection with FIG. 3. Hence, the only explanation is given to the constructional feature of the pendulum, while the other constituent parts such as the projector 109 and the housing need not be explained.

Figure 1A:
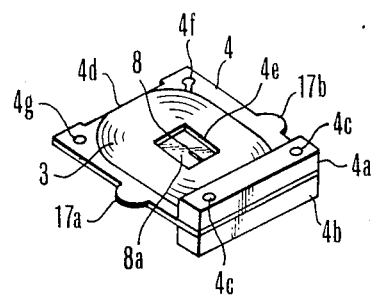
FIGS. 1(a) and 1(b) are perspective views of an example of the structure of a pendulum in an accelerometer of the invention.
Figure 3:
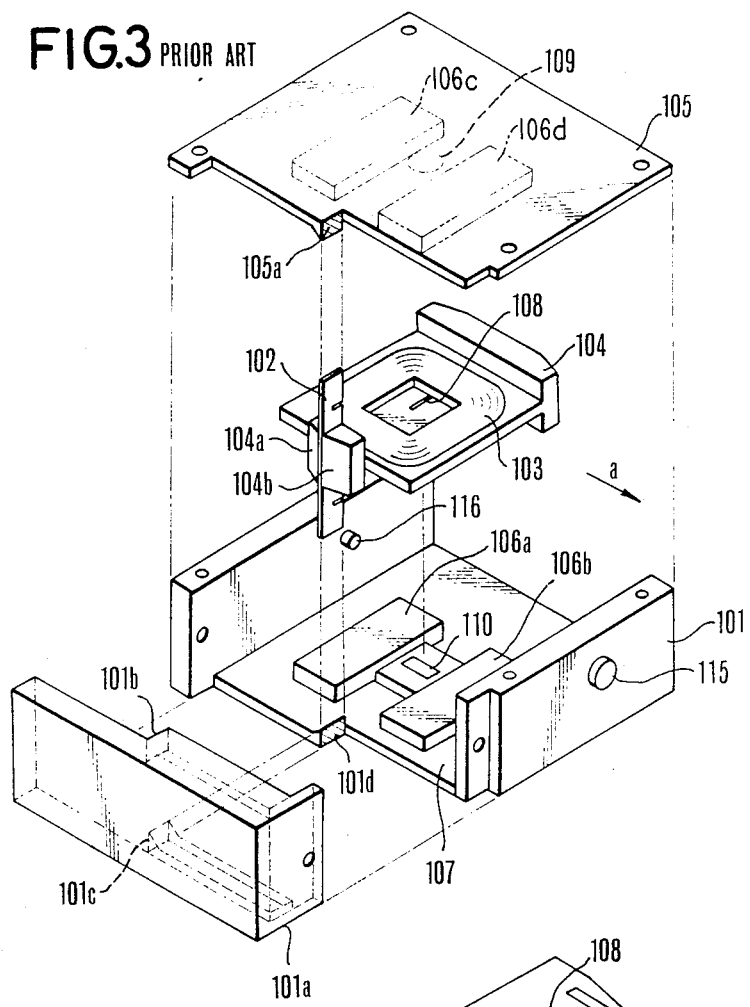
FIG. 3 is a production view of an example of the conventional structure of accelerometer to which the invention is applied.
Figure 5:
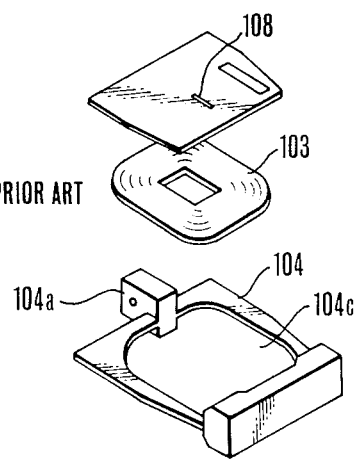
FIG. 5 is a fragmentary exploded perspective view of the prior known parts constituting the pendulum.
Figure 4:
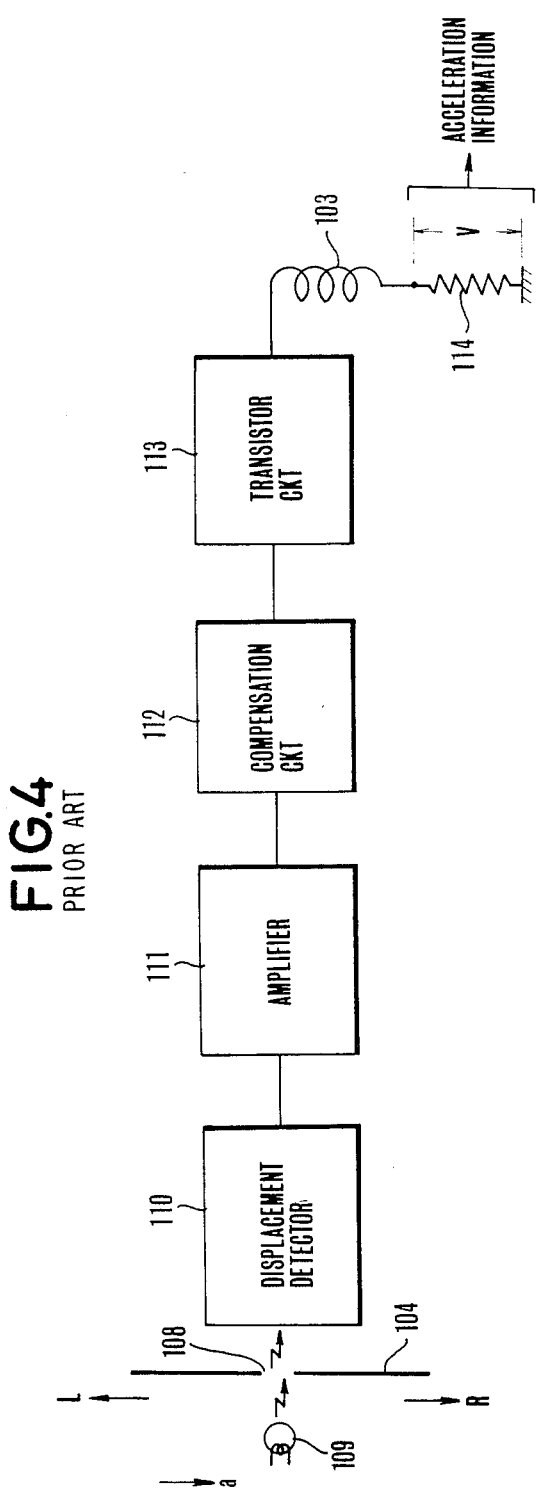
FIG. 4 is a diagram of an example of the circuitry associated with the servo-accelerometer to which the invention shown in FIGS. 1(a), 1(b) and 2 is applied.

In FIG. 1(a) there is shown one embodiment of an accelerometer according to the present invention where its pendulum which is essential to the invention is used in place of that shown in FIG. 3.

FIG. 1(a) shows this pendulum. A coil portion 3 is formed by the printing technique on each of the upper and lower surfaces of a main body 4 of the pendulum which is formed in a sheet of an almost rectangular shape with a square opening 4e at the central portion of the area thereof.

To allow for the pendulum to swing when acceleration is given to the accelerometer, a pair of bob members 4a and 4b are fixedly secured to the swing side edge of the sheet-shaped main body 4 by a pair of location rivets 4c which also serve as the location pins. Another sheet 8a which has a slit 8 is also fixedly secured to the main body 4 by the location rivets 4c. By such construction and arrangement, it is made possible to insure that the position of the slit 8 is accurately adjusted relative to the main body 4, before it is adjusted relative to the detector 110 of FIG. 3. Thus, a light beam from the projector 9 of FIG. 3 passes through the slit 8 in the central opening 4e of the sheet-shaped main body 4, impinging on the displacement detector 110 likewise as in the conventional example of FIG. 3.

Figure 1B:
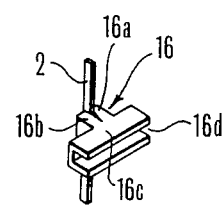

Next explanation is given to how to assemble the pendulum of such structure and a support spring 2 therefor. This spring 2 is similar to the spring 102 shown in FIG. 3. As shown in FIG. 1(b), a clamping bracket 16 has a pair of clamping members 16a and 16b between which the support spring 2 is sandwiched at the center of the length thereof in fixedly secured relation, while both ends of the support spring 2 are connected to a housing (not shown) of the accelerometer. This bracket 16 is provided with a pendulum support portion 16c having a cutout 16d elongated in a direction almost perpendicular to the length of the clamping members 16a and 16b. This cutout 16d is put into a slight recess 4d provided in the swing root side edge of the sheet-shaped main body 4 and is fixedly secured thereto by an adhesive agent. Thus, the pendulum of the invention is completed.

A pair of lead wires 4f and 4g for connection with the coil portions 3 are printed up to points very near the swing root of the pendulum main body 4. In more detail, the two coil portions 3 on either side of the main body 4 are connected to form a single coil through an interconnector in the central opening 4e. The outermost winding of the upper coil portion 3 terminates at one of the lead wires, say 4f, while the outermost winding of the lower coil portion 3 terminates at a known throughhole which is connected to the other lead wire 4g.

The thus-obtained pendulum of the invention can be fastened at its main body 4 to the support spring 2 by the clamping bracket 16. Moreover, there is no need to use the terminals which would otherwise be necessary to the coil portions to the external electrical circuit as in the prior art, since the lead wires 4f and 4g of the coil portions 3 can be used in connection to the external electrical circuit. This produces another advantage that such a connection can be established easily and quickly. Again, since the relative positions of the coil portion 3 and the slit 8 to the main body 4 of the pendulum can be adjusted with high accuracy when they are formed and assembled, a further advantage is produced that, after the accelerometer has been assembled, the direction in which the acceleration is detected and the direction of swing of the pendulum can be brought into coincidence with each other with very precise accuracy.

It should be noted that, in the embodiment described above, the main body 4 of the pendulum is provided with a pair of projections 17a and 17b on either longer side edge thereof. By these projections 17a and 17b, the dynamic range of swing motion of the pendulum is defined in cooperation with the housing. This produces an additional advantage that the stoppers 115 and 116 of the separate form can be omitted.

Figure 2:
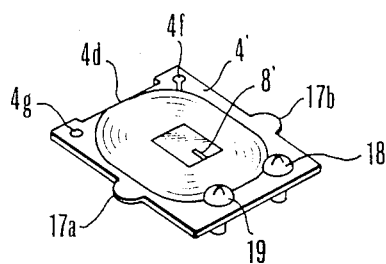
FIG. 2 is a perspective view of another embodiment of the invention with a pendulum shown exclusively.

FIG. 2 shows another embodiment of the invention, wherein the main body 4' of the pendulum has no central opening, but a slit 8' directly formed therein. Another feature is that the bob is constructed in the form of two heavy screw pins 18 and 19 on the swing end portion of the main body 4'.

With such construction and arrangement, as compared with the case of FIG. 1, the assembling operation is further simplified, and the necessary number of parts is further reduced.

As has been described above, the accelerometer according to the present invention is to make use of the sheet having the coil printed thereon as the pendulum, thereby giving advantages that the assembling operation which took a long time in the prior art is shortened, and an improvement of the manufacturability is realized, and further the attitude of the coil to the pendulum motion can be adjusted with sufficiently high accuracy when it is assembled.

Furthermore, the use of the projections 17a and 17b as the pendular amplitude limit means leads to a possibility of omitting the stoppers which was to be assembled on the framework in the prior art. This achieves a further reduction of the total necessary number of parts and of the production cost.

What is claimed is:

1. An accelerometer system comprising:
   (a) magnetic field generating means for creating a magnetic field;
   (b) a pendulum having a sheet member and a coil formed on said sheet member by a printing technique, wherein said sheet member is made of polyester;
   (c) pendulum supporting means for supporting said pendulum to be swingable in the magnetic field;
   (d) detection means for detecting a swinging motion of said pendulum;
   (e) control means, electrically connected to said coil and responsive to said detection means, for supplying a control current to said coil to suppress said swinging motion; and
   (f) output means for producing an electrical signal corresponding to the value of the control current as information of an acceleration acted on said pendulum.

2. An accelerometer system according to claim 1, wherein said output means includes a resistor connected to said coil.

3. An accelerometer system comprising:
   (a) magnetic field generating means for creating a magnetic field;
   (b) a pendulum having a sheet member and a coil formed on said sheet member by a printing technique;
   (c) pendulum supporting means for supporting said pendulum to be swingable in the magnetic field;

(d) detection means for detecting a swinging motion of said pendulum;

(e) control means, electrically connected to said coil and responsive to said detection means, for supplying a control current to said coil to suppress said swinging motion;

(f) output means for producing an electrical signal corresponding to the value of the control current as information of an acceleration acted on said pendulum; and (g) cover means, having a portion for holding said supporting means, for encasing said pendulum, wherein said sheet member has projections formed on either side edges to the direction of motion of the pendulum and arranged, upon attainment of said motion to the end of a range, to abut on said cover means.

4. A detection device for detecting the magnitude of acceleration, wherein the device displaces from an initial position upon acceleration, the displacement being judged from a position at which light flux passing through a slit in the device is received, and the magnitude of acceleration being detected from the intensity of electric current necessary to produce an electromagnetic driving power required for returning the device to the initial position, comprising:

(a) a displacement member which displaces from the initial position;

(b) a coil for generating the electromagnetic driving power to return the displacement member to its initial position, said coil being printed on said displacement member;

(c) a slit member in which the slit is formed, said slit member being formed as a separate member from the displacement member; and (d) fixing means for fixing the slit member on the displacement member.

* * * * *